March 7, 1967  E. H. WILLIAMS  3,307,893
WHEEL SUPPORT STRUCTURE
Filed May 24, 1965
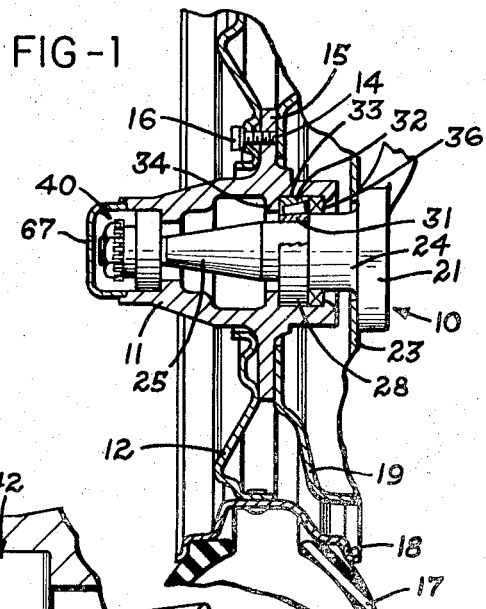
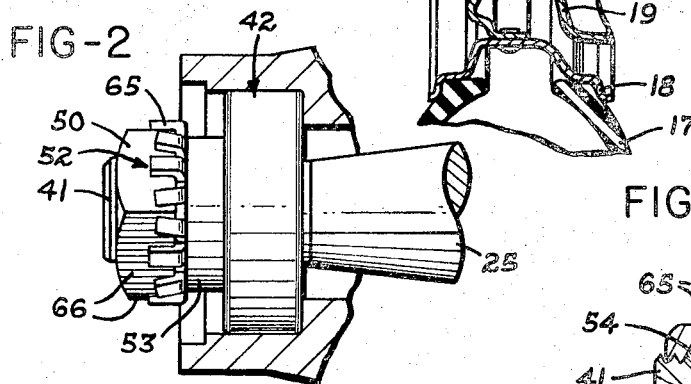
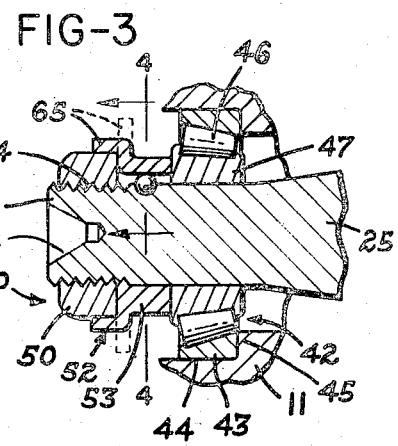
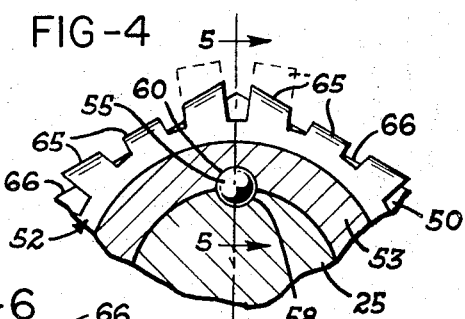
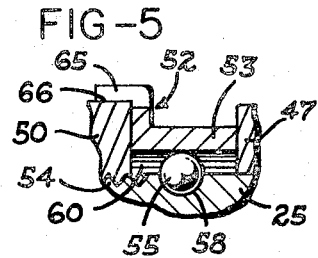
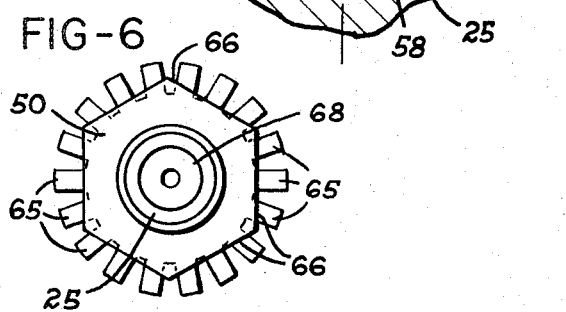
INVENTOR.
EVERETT H. WILLIAMS
BY
*Marechal, Biebel, French & Bugg*
ATTORNEYS

United States Patent Office 3,307,893
Patented Mar. 7, 1967

3,307,893
WHEEL SUPPORT STRUCTURE
Everett H. Williams, 1614 B Ave.,
New Castle, Ind. 47362
Filed May 24, 1965, Ser. No. 458,097
5 Claims. (Cl. 308—236)

This invention relates to apparatus for mouting a rotary member on a stationary support, and more particularly to mounting a wheel on a steering knuckle or the like.

The present practice in mounting an automobile wheel on a steering knuckle requires that the spindle first be threaded, and then a keyway cut through these threads. A cotter pin hole is then bored through the threaded portion, and then the threads are chased to remove burrs created by the formation of the keyway and the boring operation. The hub of the wheel is then inserted onto the spindle of the steering knuckle, and the outer bearing secured in place by a lock washer having a radially inward extending projection which is received in the keyway to prohibit rotation of this lock washer. A nut is then placed on the threaded portion to hold the lock washer and bearing in place, as well as to regulate the pressure exerted on the bearing. Once the proper pressure between the nut and bearing is reached, the nut is rotated until an opening therethrough is aligned with the cotter pin hole through the shaft, and then the cotter pin is inserted.

An important object of this invention is to provide a new and improved apparatus for securing the wheel to the steering knuckle or to secure a thrust bearing in place on a shaft which apparatus has maximum strength and which does not require the usual large number of machine operations during the formation thereof thus reducing the cost of manufacture thereof.

Another object of this invention is to provide a bearing retainer assembly for use in a steering knuckle or the like wherein the cutting of a keyway and the boring of a hole for a cotter pin are eliminated with the consequent elimination of any need to rechase the threads for burr removal and the resultant scrapping which frequently occur due to cross-threading, and particularly to provide a bearing retainer assembly which can be quickly assembled and disassembled and which requires less metal and threading.

A further object of this invention is to provide an improved steering knuckle apparatus of the aforesaid type wherein the pressure exerted by the nut on the outer bearing can be regulated more accurately than the prior art devices, and further to provide a device for locking the nut in place without the use of a cotter pin.

Other objects and advantages of the invention will be apparent from the following description, the accompanying drawings and the appended claims.

In the drawings—

FIG. 1 is a vertical sectional view through a steering knuckle showing the apparatus in accordance with this invention;

FIG. 2 is an enlarged sectional view showing the left-hand end of the steering knuckle shown in FIG. 1;

FIG. 3 is a sectional view taken vertically through the apparatus shown in FIG. 2;

FIG. 4 is an enlarged sectional view along the line 4—4 of FIG. 3;

FIG. 5 is a sectional view taken along the line 5—5 of FIG. 4; and

FIG. 6 is an end view looking from left to right in FIG. 2.

Referring to the drawings wherein a preferred embodiment of the invention is shown, FIG. 1 illustrates a typical use of the present invention. That is, the conventional steering knuckle 10 has a hub 11 secured thereto, and this hub has a conventional wheel 12 secured thereto by the studs 14 which extend from the flange 15 on the hub 11 and secure the nuts 16. The tire 17 is supported between the outer peripheral flanges 18 of the wheel 12 in the usual manner. A brake drum support 19 is also secured in place on the flange 15, and the inner end 21 of the steering knuckle 10 has a brake shoe support plate 23 secured thereto for supporting the conventional brake shoes (not shown).

The inner end portion 24 of the spindle 25 supports the hub 11 through the roller bearing 28 which consists of an inner race 31 in engagement with the spindle 25 and an outer race 32 which is secured to the inner surface 33 of the hub 11 adjacent the radially inward extending shoulder 34. This arrangement prohibits movement of the hub 11 to the right with respect to the spindle 25, as viewed in FIG. 1, and the packing 36 is provided on the right-hand side of the bearing 28 to keep dirt and other particles from the bearing 28.

Movement of the hub 11 to the left with respect to the spindle 26 is prohibited by the fastening assembly 40 (shown in FIGS. 2–6) which forms an important part of this invention. The outer end 41 of the spindle 25 is supported in the left end of the hub 11 by the roller bearing 42 which includes the outer race 43 engaging the inner surface 44 and the radially inward extending shoulder 45 on the hub 11. The rollers 46 are disposed between the outer race 43 and an inner race 47 which is slidably received on the spindle 25. It is important that the hub 11 and bearing 42 be held against axial movement with respect to the spindle 25, and that the rotary movement of the hub 11 not in any way affect the position of the nut 50 which locks the bearing 42 in place, as will be seen.

The bearing 42 is held in place by the annular locking washer 52 having a tubular portion 53 adapted to engage the inner race 47 of the bearing 42 after the washer 52 has been slipped onto the spindle 25 over the threads 54. This washer is held against rotary movement on the spindle 25 by the ball 55 received in the semi-spherical depression 58 in the left-hand end portion 41 of the spindle 25, and this ball has a diameter slightly less than that of the depression for snug engagement therebetween. The tubular portion 53 of the washer has an axial groove 60 formed therein having a radius at least equal to the radius of the ball 55 so that this ball is received within the groove and relative movement between the spindle 25 and the locking washer 52 is prohibited, and thus any relative rotary movement between the inner race 47 and the spindle will not rotate the locking washer 52.

The nut 50 is then threaded onto the threads 54 on the end 41 of the spindle 25 until it snugly engages the locking washer 52. The locking washer has eighteen equally spaced fingers 65 which extend radially outward from the tubular portion 53 to the periphery thereof, as shown in FIGS. 3–6, and these fingers are relatively thin so that they can be deformed with ease. It is however within the scope of this invention to use a larger or smaller number of fingers 65 so long as the functional requirements set forth below are maintained. At this time, the nut 50 is loosened one-third turn as easily calculated by counting six fingers 65 which any single portion of the nut 50 passes. When this is completed, the fingers 65 are then deformed onto the adjacent flat surfaces 66 of the nut 50 to prohibit rotation thereof and thus lock it in position. The cap 67 (FIG. 1) is thus secured on the left end of the hub 11 to prevent dirt and other contaminants from entering the interior of the hub 11.

The deformed fingers 65 easily hold the nut 50 against rotation on the threads 54 since there is no angular force imparted to this nut during rotation of the wheel since the ball 55 prohibits a rotary movement of the locking washer 52. The nut absorbs the axial thrust of the inner race 47 of the bearing 42 by prohibiting axial movement of the locking washer, whereas this locking washer and the ball 55 prohibit rotation.

The end 41 of the spindle 25 has an enlarged center 68 formed therein for use in mounting the spindle 25 during the machining operations. This enlarged center is possible since no cotter pin hole is required, and provides a more stable support for the spindle during grinding, turning, etc. so that heavier machining pressure can be used to speed production. Moreover, because the cotter pin hole and keyway are eliminated the number of threads is reduced so that the length of the spindle is shortened up to one-half inch thereby producing further savings in material and manufacturing costs.

It is thus seen that the only machining operation that must be performed during manufacture is that of threading the outer surface of the spindle and boring the depression 58. The complicated milling of the keyway and the rechasing of the threads, as well as the drilling of the cotter pin hole are thereby eliminated thus substantially reducing the cost required to produce the stronger knuckle assembly. The assembly and disassembly of the steering knuckle assembly is also greatly expedited due to simplicity of the invention, and the precise relief of pressure on the bearing 42 is achieved by the use of eighteen fingers 65.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A retainer assembly for securing a hub to a spindle comprising, a roller bearing having an inner race secured to the spindle and an outer race secured to the hub, a semi-spherical depression of predetermined radius in the spindle, a locking washer having a tubular portion on said spindle above said depression and having one end adjacent said inner race, an internal axial groove in said tubular portion having a radius slightly larger than said predetermined radius, a spherical ball in said depression and adapted to be received in said groove to prohibit rotation of said locking washer on the spindle while permitting axial movement of said locking washer, exterior threads on the spindle adjacent the opposite end of said locking washer, a nut received on said threads and contacting said opposite end of said locking washer to prohibit axial movement of said locking washer and said inner race, and means for locking said nut against rotary movement on the spindle.

2. A retainer assembly for securing a hub to a spindle comprising, a bearing having an inner race secured to the spindle and an outer race secured to the hub, means defining a depression of predetermined size in the spindle locking washer means having a tubular portion on said spindle above said depression and having one end in contact with said inner race, an internal axial groove in said tubular portion, a single ball means adapted to be received in said depression and said groove to prohibit rotation of said locking washer on the spindle while permitting axial movement of said locking washer, exterior threads on the spindle adjacent the opposite end of said locking washer, a nut received on said threads and contacting said opposite end of said locking washer to prohibit axial movement of said locking washer and said inner race, and means for locking said nut against rotary movement on the spindle.

3. A retainer assembly for securing a hub to a spindle comprising, a bearing having an inner race secured to the spindle and an outer race secured to the hub, means defining a depression of predetermined size in the spindle, locking washer means having a tubular portion on said spindle above said depression and having one end in contact with said inner race, an internal axial groove in said tubular portion, a single ball means adapted to be received in said depression and said groove to prohibit rotation of said locking washer on the spindle while permitting axial movement of said locking washer, exterior threads on the spindle adjacent the opposite end of said locking washer, a nut received on said threads and contacting said opposite end of said locking washer to prohibit axial movement of said locking washer and said inner race, and means for locking said nut against rotary movement on the spindle including a plurality of radially outward extending fingers on said locking washer adjacent said nut and extending radially beyond the outer surface of said nut so that they can be deformed into contact with said nut to prohibit relative rotation between said nut and said locking washer.

4. A retainer assembly for securing a hub to a spindle comprising, a bearing having an inner race secured to the spindle and an outer race secured to the hub, a semi-spherical depression of predetermined radius in the spindle, a locking washer having a tubular portion on said spindle above said depression and having one end adjacent said inner race, an internal axial groove in said tubular portion having a radius slightly larger than said predetermined radius, a spherical ball in said depression and adapted to be received in said groove to prohibit rotation of said locking washer on the spindle while permitting axial movement of said locking washer, exterior threads on the spindle adjacent the opposite end of said locking washer, a hexagonal nut having six flat sides and being received on said threads in contact with said opposite end of said locking washer to prohibit axial movement of said locking washer and said inner race, and said locking washer having eighteen radially outward extending fingers on said locking washer adjacent said nut and extending radially beyond said flat sides of said nut so that said nut can be rotated through a partial turn of a preset angular amount to achieve the desired pressure on said bearing, said fingers being flexible so that they can be deformed into contact with said sides to lock said nut against rotation.

5. A retainer assembly for securing a hub of a wheel to a spindle of steering knuckle comprising, a roller bearing having an inner race secured to the spindle and an outer race secured to the hub, a semi-spherical depression of predetermined radius in the spindle, a locking washer having a tubular portion on said spindle above said depression and having one end adjacent said inner race, an internal axial groove in said tubular portion having a radius slightly larger than said predetermined radius, a spherical ball in said depression and adapted to be received in said groove to prohibit rotation of said locking washer on the spindle while permitting axial movement of said locking washer, exterior threads on the spindle adjacent the opposite end of said locking washer, a nut having a preset number of flat sides and being received on said threads in contact with said opposite end of said locking washer to prohibit axial movement of said locking washer and said race, and said locking washer having a preset number of radially outward extending fingers on said locking washer adjacent said nut and extending radially beyond said flat sides of said nut, said number of fingers being correlated with said number of flat sides so that said nut can be precisely rotated to exert the desired pressure on said inner race, said fingers being flexible so that they can be deformed into contact with said sides to lock said nut.

References Cited by the Examiner
UNITED STATES PATENTS

| | | | |
|---|---|---|---|
| 926,953 | 7/1909 | Mervin | 151—53 |
| 2,970,018 | 1/1961 | Ruttgers | 308—236 |

MARTIN P. SCHWADRON, *Primary Examiner.*

FRANK SUSKO, *Examiner.*